US012642156B2

(12) United States Patent
Saravanan et al.

(10) Patent No.: US 12,642,156 B2
(45) Date of Patent: Jun. 2, 2026

(54) METHODS AND SYSTEMS FOR ASSISTING AN ELECTRIC VEHICLE IN HEADLAND OPERATIONS

(71) Applicant: Mahindra & Mahindra Limited, Chengalpattu (IN)

(72) Inventors: Natarajan Saravanan, Chengalpattu (IN); Arumugham Sivakumar, Chengalpattu (IN); Ayyasamy Gokila, Chengalpattu (IN); Singh Pramod, Chengalpattu (IN); Abbaas Mohd Ali, Chengalpattu (IN); Sundaram Pavithra, Chengalpattu (IN)

(73) Assignee: Mahindra & Mahindra Limited, Chengalpattu (IN)

( * ) Notice: Subject to any disclaimer, the term of this patent is extended or adjusted under 35 U.S.C. 154(b) by 110 days.

(21) Appl. No.: 18/612,322

(22) Filed: Mar. 21, 2024

(65) Prior Publication Data

US 2025/0098561 A1　Mar. 27, 2025

(51) Int. Cl.
| | |
|---|---|
| *A01B 69/00* | (2006.01) |
| *B60L 15/02* | (2006.01) |
| *B60L 15/20* | (2006.01) |

(52) U.S. Cl.
CPC .......... *A01B 69/007* (2013.01); *B60L 15/025* (2013.01); *B60L 15/2009* (2013.01); *B60L 2240/12* (2013.01); *B60L 2240/24* (2013.01); *B60L 2240/46* (2013.01); *B60L 2260/42* (2013.01)

(58) Field of Classification Search
CPC . A01B 69/007; B60L 15/025; B60L 15/2009; B60L 2240/12; B60L 2240/24; B60L 2240/46; B60L 2260/42

USPC ........................................................... 701/41
See application file for complete search history.

(56) References Cited

U.S. PATENT DOCUMENTS

| | | | | |
|---|---|---|---|---|
| 5,383,531 A | * | 1/1995 | Yoshioka | B60K 23/0808 |
| | | | | 280/93.506 |
| 5,524,079 A | * | 6/1996 | Ishida | B62D 7/159 |
| | | | | 701/42 |
| 5,799,261 A | * | 8/1998 | Ozaki | B60T 8/17636 |
| | | | | 701/72 |
| 5,829,847 A | * | 11/1998 | Tozu | B60T 8/1755 |
| | | | | 303/169 |
| 5,944,393 A | * | 8/1999 | Sano | B60T 8/4827 |
| | | | | 303/146 |

(Continued)

*Primary Examiner* — Logan M Kraft
*Assistant Examiner* — John D Bailey
(74) *Attorney, Agent, or Firm* — Amster, Rothstein & Ebenstein LLP

(57) ABSTRACT

Embodiments herein disclose methods and systems for optimizing the productivity and improving the stability of electric vehicles by sensing field size and soil condition and automatically assisting the vehicle to turn by rotating inner wheels faster as compared to outer wheels of the vehicle and rotating front wheels of the vehicle faster as compared to rear wheels of the vehicle, and selectively braking respective wheel during headland operations. Embodiments herein enable operators to attain tight headland turns with lower head land space. Embodiments herein can detect a plurality of parameters such as, field conditions, soil condition, implements(s) connected to the vehicle, and so on, and control the turning radius of the vehicle as per requirement in at least one mode.

12 Claims, 18 Drawing Sheets

(56) References Cited

U.S. PATENT DOCUMENTS

| | | | | |
|---|---|---|---|---|
| 6,009,364 A * | 12/1999 | Wada | B60T 8/1764 | |
| | | | 701/84 | |
| 6,026,343 A * | 2/2000 | Ogino | B60T 8/1755 | |
| | | | 701/72 | |
| 6,112,826 A * | 9/2000 | Ura | B60K 17/30 | |
| | | | 172/255 | |
| 6,112,842 A * | 9/2000 | Ura | B60W 10/18 | |
| | | | 303/190 | |
| 6,320,497 B1 * | 11/2001 | Fukumoto | B60K 35/654 | |
| | | | 701/32.7 | |
| 6,644,429 B2 * | 11/2003 | Evans | F16H 61/431 | |
| | | | 180/246 | |
| 10,939,605 B2 * | 3/2021 | Matsuzaki | A01B 69/008 | |
| 2003/0218378 A1 * | 11/2003 | Tanaka | B60W 10/14 | |
| | | | 303/146 | |
| 2005/0236894 A1 * | 10/2005 | Lu | B62D 11/08 | |
| | | | 303/139 | |
| 2009/0248258 A1 * | 10/2009 | Fukumoto | A01C 11/003 | |
| | | | 701/50 | |
| 2011/0060503 A1 * | 3/2011 | Futahashi | B62D 6/008 | |
| | | | 701/41 | |
| 2013/0221745 A1 * | 8/2013 | Vershinin | B60L 58/13 | |
| | | | 307/10.1 | |
| 2016/0039421 A1 * | 2/2016 | Kaneta | B60T 8/1706 | |
| | | | 477/73 | |
| 2016/0208665 A1 * | 7/2016 | Koike | F01N 3/023 | |
| 2017/0144702 A1 * | 5/2017 | Dang | A01B 69/008 | |
| 2017/0355372 A1 * | 12/2017 | Kuroshita | B60T 11/21 | |
| 2018/0065662 A1 * | 3/2018 | Kim | B62D 7/159 | |
| 2018/0236989 A1 * | 8/2018 | Lian | B60T 8/172 | |
| 2019/0002021 A1 * | 1/2019 | Yoo | B62D 6/02 | |
| 2021/0245778 A1 * | 8/2021 | Suzuki | B60W 50/06 | |
| 2021/0284127 A1 * | 9/2021 | Mckeown | B60T 8/1755 | |
| 2022/0073054 A1 * | 3/2022 | Sallee | B60W 50/085 | |
| 2022/0219676 A1 * | 7/2022 | Cao | B60K 1/02 | |
| 2023/0017430 A1 * | 1/2023 | Matsuno | B60L 15/2036 | |
| 2023/0069372 A1 * | 3/2023 | Morimoto | G05D 1/617 | |
| 2023/0182579 A1 * | 6/2023 | Koga | B60W 10/20 | |
| | | | 303/152 | |
| 2023/0200282 A1 * | 6/2023 | Yamaguchi | G05D 1/246 | |
| | | | 701/23 | |
| 2023/0249687 A1 * | 8/2023 | Omohundro | B60W 30/18145 | |
| | | | 701/41 | |
| 2023/0271612 A1 * | 8/2023 | Keller | B60W 10/184 | |
| | | | 701/41 | |
| 2023/0365209 A1 * | 11/2023 | Yang | B62D 59/04 | |
| 2024/0149922 A1 * | 5/2024 | Yeom | B60W 50/0098 | |
| 2024/0425023 A1 * | 12/2024 | Kasuya | B60T 7/12 | |
| 2025/0026402 A1 * | 1/2025 | Kim | B62D 6/003 | |
| 2025/0042399 A1 * | 2/2025 | Tomioka | B60W 50/14 | |
| 2025/0083741 A1 * | 3/2025 | Yang | B60L 15/00 | |

* cited by examiner

100

Collect data related to the field, where the vehicle is currently operating        101

Determine the soil condition and field size        102

Select a mode of operation of the vehicle        103

Operate the vehicle using the selected mode        104

200

METHODS AND SYSTEMS FOR ASSISTING AN ELECTRIC VEHICLE IN HEADLAND OPERATIONS

TECHNICAL FIELD

Embodiments disclosed herein relate to farm vehicles and more particularly, to optimizing the productivity and improving the stability of farm vehicles during headland operations, wherein the farm vehicles are electric vehicles.

BACKGROUND

In field operations, such as during a headland turn, an operator of the vehicle has to perform multiple operations like steering, implement lifting and sometimes, performing inner wheel braking for making tighter turns. This can lead to operator fatigue and degrade the customer ownership experience.

Conventional ICE powered tractors have a single source of power and then the power is distributed generally through mechanical transmission. This restricts the tractor from having a variable wheelbase since front and rear axles are connected through mechanical drive.

For Indian farming applications, farmers may have different field sizes and 1-2% productivity will be lost while making headland turns. For example, the user may skip one or two rows, due to limitations when making turns.

Further, the condition of the soil may affect the stability of the vehicle while making turns during operations.

OBJECTS

The principal object of embodiments herein is to disclose methods and systems for optimizing the productivity and improving the stability of electric vehicles by assisting the vehicle to turn by rotating outer wheels faster as compared to inner wheels of the vehicle and rotating front wheels of the vehicle faster as compared to rear wheels of the vehicle, and selectively braking the rear wheels during headland operations.

Another object of embodiments herein is to achieve shorter turning radius by the vehicle when the vehicle is taking headland turns.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
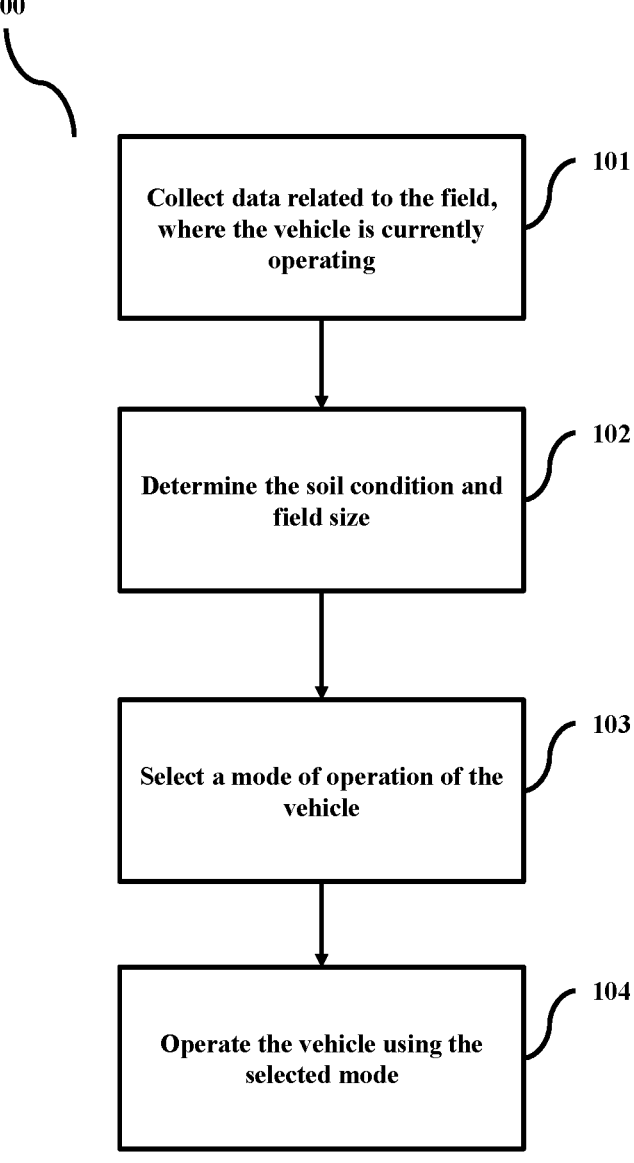
FIG. 1 is a flowchart depicting the process of selecting a mode of operation for an electric vehicle, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve methods and systems for optimizing the productivity and improving the stability of electric vehicles by assisting the vehicle to turn by rotating outer wheels faster as compared to inner wheels of the vehicle and rotating front wheels of the vehicle faster as compared to rear wheels of the vehicle, and selectively braking respective rear wheel during headland operations. Referring now to the drawings, and more particularly to FIGS. 1 through 9, where similar reference characters denote corresponding features consistently throughout the figures, there are shown embodiments.

The farm vehicle as referred to herein can be any electric vehicle that operates in farms, similar environments, or its surroundings. Examples of the electric vehicle can be, but not limited to, tractors, ploughers, threshers, and so on.

Embodiments herein enable operators to attain tight headland turns with lower headland space. Embodiments herein can detect a plurality of parameters such as, field conditions (such as field size), soil condition (hard, soft, medium), implements(s) connected to the electric vehicle (if any), vehicle speed and location, and so on, and control the turning radius of the vehicle as per requirement in at least one mode. Embodiments herein may control the turning radius of the vehicle by automatically speeding up the front wheels or outer wheels based on field and vehicle conditions, wherein controlling the turning radius of the vehicle comprises adjusting one or more motors present on one or more axles of the vehicle.

FIG. 1 is a flowchart depicting the process of selecting a mode of operation for an electric vehicle. Consider that data related to the vehicle, such as, but not limited to, dimensions of the vehicle, turning radius of the vehicle (with/without braking), implement(s) currently connected to the vehicle, and so on, are pre-configured by an operator and/or authorized person. In step 101, the data related to the field, where the vehicle is currently operating, is collected. In an embodiment herein, the data can be collected using a camera (mounted on the vehicle), processing media from the camera, and estimating the field size and location of significant areas (such as the headlands) using the processed media. In an embodiment herein, the user/operator can provide the data related to the field. Using GPS data, a user interface (UI) can be used to display the current location of the vehicle to the user, and the user can mark out the location and size of the field, headland area on the user interface. In step 102, the soil condition is determined. Examples of the soil condition can be, but not limited to, hard, soft, medium, and so on. A draft sensor can be mounted in a suitable location on the vehicle (such as the 3-point linkage). The draft sensor can sense the soil in the field and determine the condition of the soil based on draft values. In step 103, a mode for operation of the vehicle is automatically selected, based on the determined soil conditions. In an embodiment herein, the mode can be selected manually. In an embodiment herein, the mode can be selected automatically, based on additional parameters, such as, current turning angle, farm size, soil conditions, current wheel angle, brake pedal status (actuated/not actuated), vehicle speed, and so on. In step 104, the vehicle is operated using the selected mode. The various actions in method 100 may be performed in the order presented, in a different order or simultaneously. Further, in some embodiments, some actions listed in FIG. 1 may be omitted.

Figure 2:
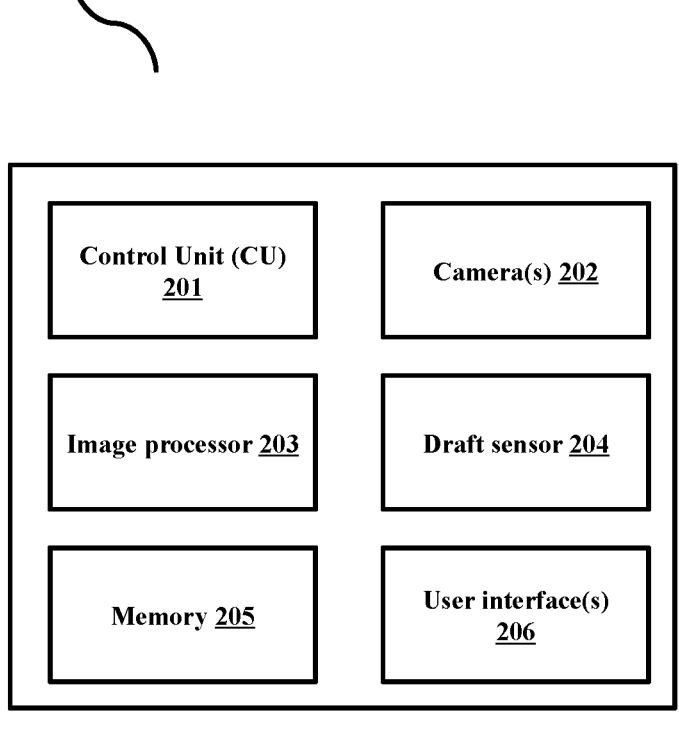
FIG. 2 depicts an architecture for selecting a mode of operation of the vehicle, when the vehicle is taking a headland turn, according to embodiments as disclosed herein.

FIG. 2 depicts an architecture for selecting a mode of operation of the vehicle, when the vehicle is taking a headland turn. The system (200), as depicted, comprises a control unit (CU) (201), one or more cameras (202), an image processor (203), a draft sensor (204), a memory (205), and one or more user interfaces (206).

The one or more user interfaces (206) can enable the user and/or operator to interact with the vehicle, and perform one or more operation (such as selecting/de-selecting the mode of operation of the vehicle, providing data related to the farm/field, where the vehicle is operating, and so on). The user interface (206) can also enable the user to view data such as the currently selected mode, the speed of the vehicle, location of the user, and so on. Examples of the user interface (206) can be, but not limited to, a display, one or more switches, one or more lights, an instrument console, a panel, and so on. The user interface (206) can also comprise a device belonging to the user, such as, a mobile device, a phone, a tablet, a wearable device, a computer, an Internet of Things (IoT) device, and so on.

One or more cameras (202) can collect information of the location of the field. The information can be at least one of images, videos, and so on. The cameras can be mounted on the vehicle, in such locations so as to get a clear field of view of the location of the vehicle. The information can be provided to the image processor (203), wherein the image processor (203) can process the information. Examples of the processing done can be levelling, cropping out unnecessary portions (such as the sky), noise reduction, and so on. The processed information can be provided to the CU (201). The CU (201) can analyze the information to determine data related to the field, such as field size, shape, headland location, and so on.

The draft sensor (204) can determine the current soil condition. The draft sensor can be mounted in a suitable location on the vehicle (such as the 3-point linkage). The draft sensor (204) can sense the soil in the field and determine the condition of the soil based on the sensed draft values. The draft sensor (204) can provide the sensed draft values to the CU (201).

The CU (201), based on the information received from the image processor (203) and the draft sensor (204), and additional data (such as the soil draft value, current speed of the vehicle, current turning angle, current wheel angle, brake pedal status, implement width and so on), can determine the mode of operation of the vehicle. The mode of operation can be one of a low mode, a medium mode, and a high/ aggressive mode. Based on the selected mode, the CU (201) can adjust the speed of the driving motors of the respective wheels and/or adjust the brakes of the vehicle, so as to enable the vehicle to make headland turns with minimal radius.

In an embodiment herein, the user can manually select the mode of operation using the user interface (206). Based on the selected mode, the CU (201) can adjust the speed of the driving motors of the respective wheels and/or adjust the brakes of the vehicle, so as to enable the vehicle to make headland turns with minimal radius.

The memory (205) stores at least one of, the vehicle data, the field data, camera feed, sensed soil conditions, currently selected mode, current operating conditions of the vehicle (such as speed, brake status, steering wheel angle, and so on), current implement(s) being used, and so on. Examples of the memory (205) may be, but are not limited to, NAND, embedded Multimedia Card (eMMC), Secure Digital (SD) cards, Universal Serial Bus (USB), Serial Advanced Technology Attachment (SATA), Solid-State Drive (SSD), and so on. Further, the memory (205) may include one or more computer-readable storage media. The memory (205) may include one or more non-volatile storage elements. Examples of such non-volatile storage elements may include Read Only Memory (ROM), magnetic hard discs, optical discs, floppy discs, flash memories, or forms of Electrically PROgrammable Memories (EPROM) or Electrically Erasable and PROgrammable Memories (EEPROM). In addition, the memory (205) may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that may, over time, change (e.g., in Random Access Memory (RAM) or cache).

The vehicle can comprise of additional sensors/modules such as GPS sensors, wheel speed sensor, brake actuators, brake pedal latch sensors, and so on (not shown), which provide data and information to the CU (201) and/or to the user/operator.

Consider that the headland turn is not very complicated; i.e., the field size is sufficiently large that the headland turn is greater than the required width with respect to vehicle dimensions. In other words, the vehicle can perform a headland turn with a higher turning radius. The headland required for the low mode can be:

Headland required for low mode = turning radius +

1/2(working width or the width of the vehicle) + safety distance

Further, the soil draft value is greater than 1000 kg. Accordingly, the CU (201) selects the low mode and displays instructions to the user. In an example, the CU (201) can inform the user to skip 2 rows and then attempt the headland turn. The CU (201) can activate the low mode, when the steering wheel angle is greater than a first pre-defined angle (for example, 30 degrees).

Consider that the headland turn is complicated; i.e., with respect to field size & vehicle dimension, headland turn is equal to the required width with respect to vehicle dimensions. The headland required for the medium mode can be:

Headland required for medium mode = turning radius + 1/2(working width or the width of the vehicle)

Further, the soil draft value is greater than 500 kg. Accordingly, the CU (201) selects the medium mode and displays instructions to the user. In an example, the CU (201) can inform the user to skip 1 row and then attempt the headland turn. The CU (201) can activate the medium mode, when the steering wheel angle is greater than a second pre-defined angle (for example, 25 degrees).

Consider that the headland turn is very complicated; i.e., space available for the headland turn is less than the space required by the vehicle for making a turn. The headland required for the high/aggressive mode can be:

Headland required for high/aggressive mode = turning radius +

1/2(working width or the width of the vehicle) − safety distance

Further, the soil draft value is from 0 to 500 kg. Accordingly, the CU (201) chooses the high/aggressive mode and displays instructions to the user. In an example, the CU (201) can inform the user to skip 1 row and then attempt the headland turn. The CU (201) can activate the high/aggressive mode, when the steering wheel angle is greater than a third pre-defined angle (for example, 20 degrees).

Figure 3:
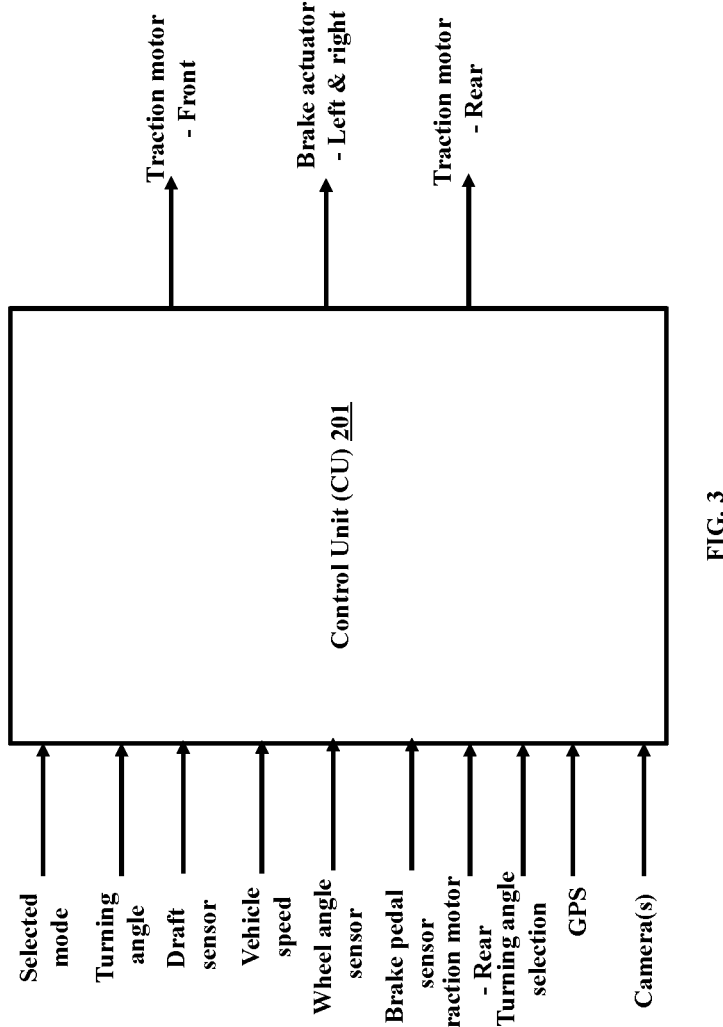
FIG. 3 depicts an architecture wherein a single traction motor is used for the front wheels and a single traction motor is used for the rear wheels, according to embodiments as disclosed herein.
Figure 4A:
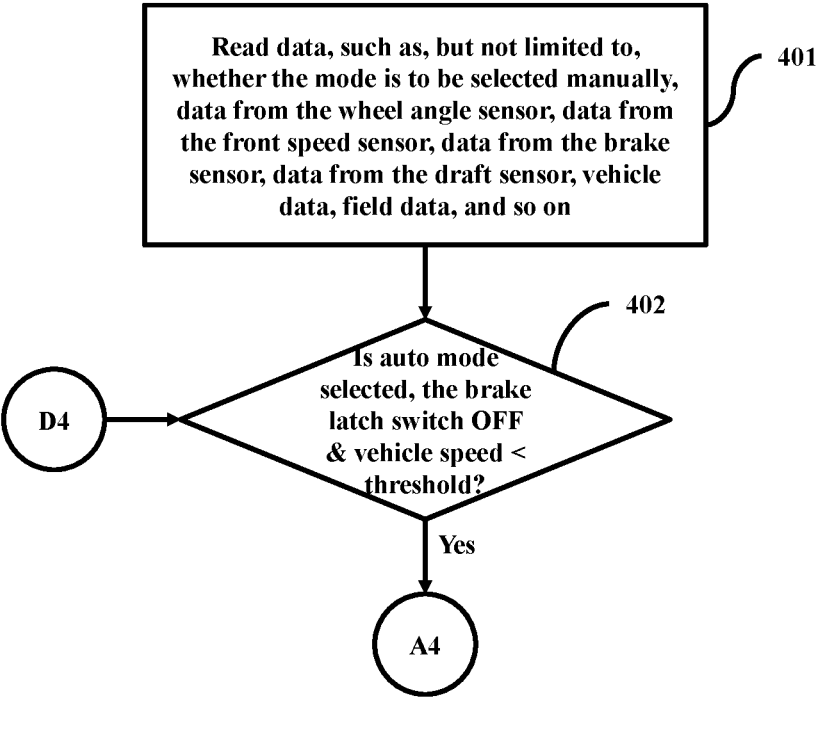
FIGS. 4A, 4B, 4C and 4D are flowcharts depicting the process of using a single traction motor for the front wheels and a single traction motor for the rear wheels respectively, according to embodiments as disclosed herein.
Figure 4B:
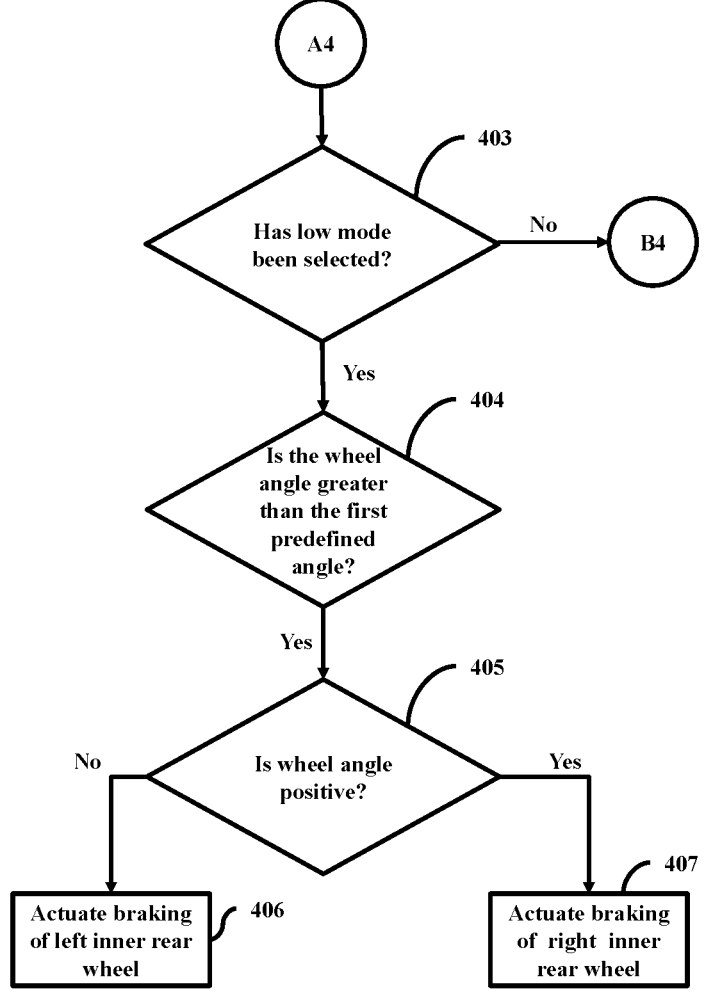
Figure 4C:
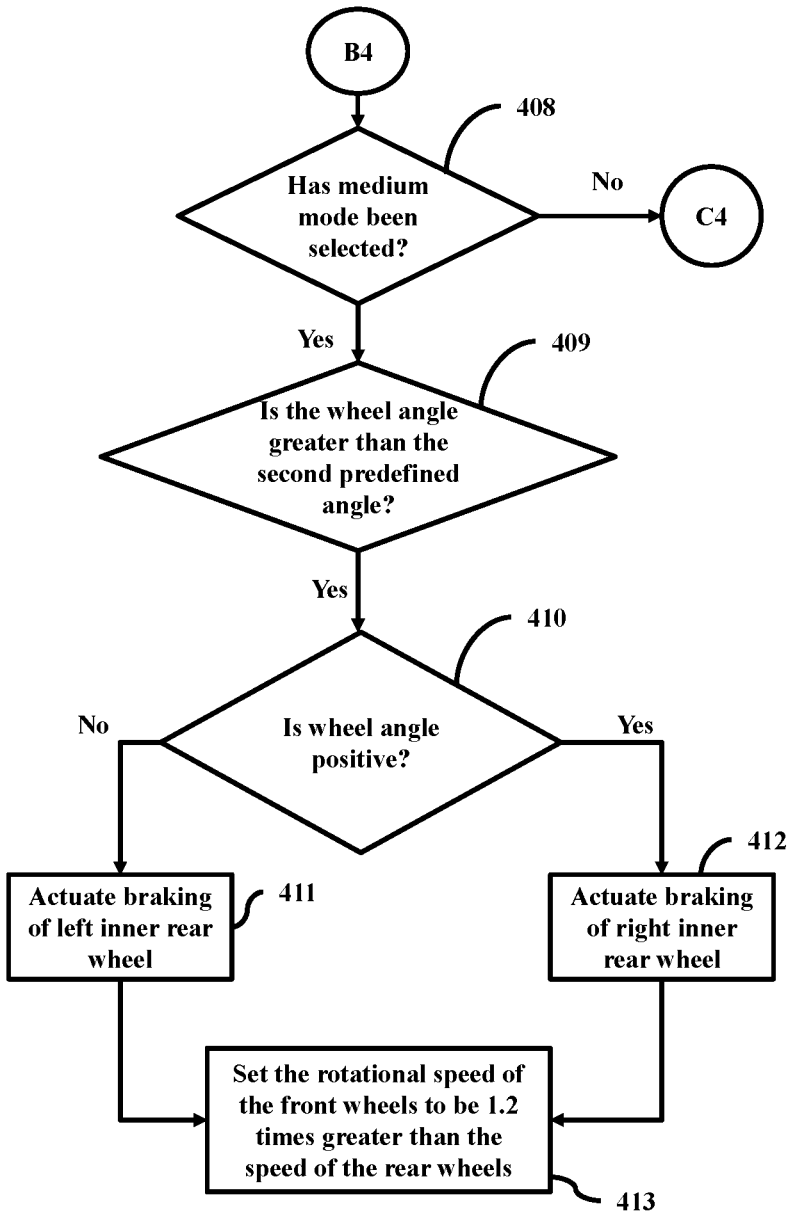
Figure 4D:
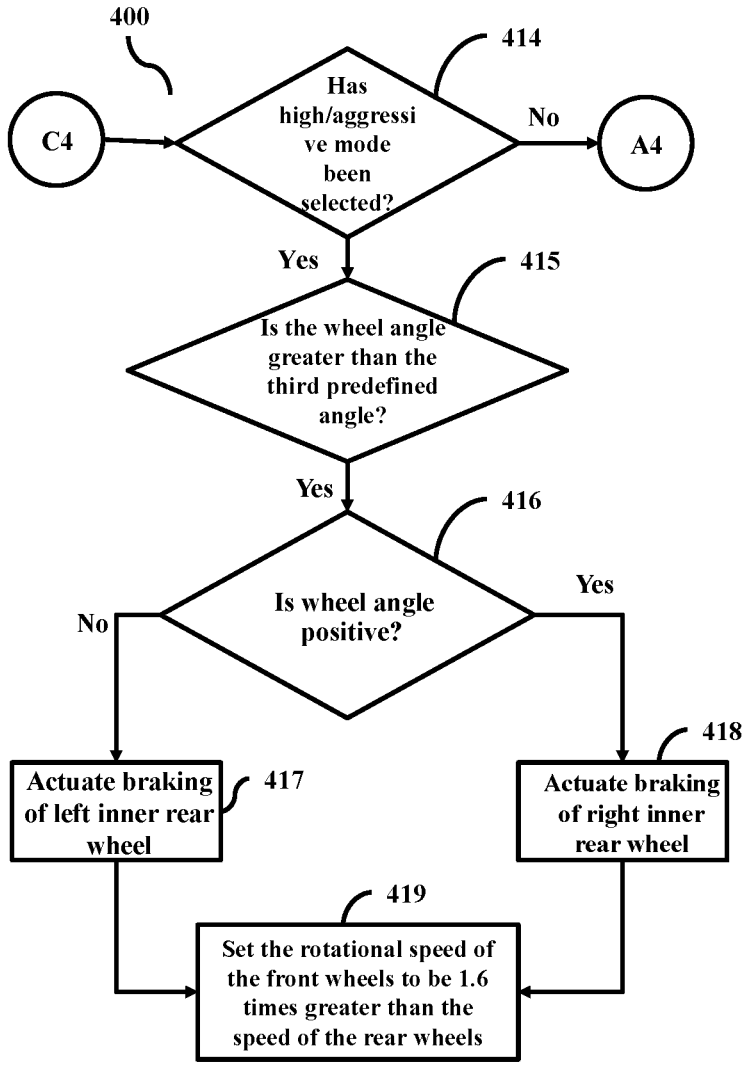

FIG. 3 depicts an architecture wherein a single traction motor is used for the front wheels and a single traction motor is used for the rear wheels. Both the front and rear axles of the vehicle have differential to enable the inner wheel to slip during a turning operation. Based on factors such as whether the mode has been selected manually, turning angle, soil conditions, vehicle speed, wheel angle (from the front right side), brake pedal latch status, inputs from the rear traction motor (TR), the GPS sensor and the camera, the CU (201) can actuate the inner wheel brake actuator and/or speed of the front wheels (based on the mode, that has been currently selected).

If the low mode has been selected, and if the output of the wheel angle sensor is greater than the first predefined angle, and the brake pedal latch switch is off, the CU (201) activates one of the brake actuators (either the left side or the right side), depending on which side the vehicle is turning. Depending on the turning side, the CU (201) can apply brakes to the respective inner rear wheel. The CU (201) can determine that the vehicle is making a right turn, by detecting that the wheel angle is positive. The CU (201) can determine that the vehicle is making a left turn, by detecting that the wheel angle is negative.

If the medium mode has been selected, and if the output of the wheel angle sensor is greater than the second predefined angle (but less than the first predefined angle), and the brake pedal latch switch is off, the CU (201) activates one of the brake actuators (either the left side or the right side), depending on which side the vehicle is turning. The CU (201) can determine that the vehicle is making a right turn, by detecting that the wheel angle is positive. The CU (201) can determine that the vehicle is making a left turn, by detecting that the wheel angle is negative. Depending on the turning side, the CU (201) can apply brakes to the respective inner rear wheel. The CU (201) can further increase the rotational speed of the front wheels to a first speed greater than the rotational speed of the rear wheels. In an example, the CU (201) can further increase the rotational speed of the front wheels to be 1.2 times faster, as compared to the rotational speed of the rear wheels.

If high/aggressive mode has been selected, and if the output of the wheel angle sensor is greater than the third predefined angle (but less than the second predefined angle), and the brake pedal latch switch is off, the CU (201) activates inner wheel brake actuators (either the left side or the right side), depending on which side the vehicle is turning. The CU (201) can determine that the vehicle is making a right turn, by detecting that the wheel angle is positive. The CU (201) can determine that the vehicle is making a left turn, by detecting that the wheel angle is negative. Depending on the turning side, the CU (201) can apply brakes to the respective inner rear wheel. The CU (201) can further increase the rotational speed of the front wheels to be a second speed greater than the rotational speed of the rear wheels. In an example, the CU (201) can further increase the rotational speed of the front wheels to be 1.6 times faster, as compared to the rotational speed of the rear wheels.

FIGS. 4A, 4B, 4C and 4D are flowcharts depicting the process of using a single traction motor for the front wheels and a single traction motor for the rear wheels respectively. In step 401, the CU (201) reads data, such as, but not limited to, whether the mode is to be selected manually, data from the wheel angle sensor, data from the front speed sensor, data from the brake latch switch, data from the draft sensor, vehicle data, field data, and so on. In step 402, the CU (201) checks if the mode has to be selected automatically, the brake latch switch is OFF, and the speed of the vehicle is less than a pre-defined speed threshold. If the mode has to be selected automatically, the brake latch switch is OFF, and the speed of the vehicle is less than a pre-defined speed threshold, in step 403, the CU (201) checks if the low mode has been selected. In the low mode has been selected, in step 404, the CU (201) checks if the wheel angle is greater than the first predefined angle. If the wheel angle is greater than the first predefined angle, in step 405, the CU (201) checks if the wheel angle is positive. If the wheel angle is not positive, in step 406, the CU (201) actuates braking of the left inner rear wheel. If the wheel angle is positive, in step 407, the CU (201) actuates braking of the right inner rear wheel.

If the low mode has not been selected, in step 408, the CU (201) checks if the medium mode has been selected. If the medium mode has been selected, in step 409, the CU (201) checks if the wheel angle is greater than the second predefined angle. If the wheel angle is greater than the second predefined angle, in step 410, the CU (201) checks if the wheel angle is positive. If the wheel angle is not positive, in step 411, the CU (201) actuates braking of the left inner rear wheel. If the wheel angle is positive in step 412, the CU (201) actuates braking of the right inner rear wheel. In step 413, the CU (201) sets the rotational speed of the front wheels to be a first speed greater than the speed of the rear wheels. In an example, the CU (201) can further increase the rotational speed of the front wheels to be 1.2 times faster, as compared to the rear wheels.

If the medium mode has not been selected, in step 414, the CU (201) checks if the high/aggressive mode has been selected. If the high/aggressive mode has been selected, in step 415, the CU (201) checks if the wheel angle is greater than the third predefined angle. If the wheel angle is greater than the third predefined angle, in step 416, the CU (201) checks if the wheel angle is positive. If the wheel angle is not positive, in step 417, the CU (201) actuates braking of the left inner rear wheel. If the wheel angle is positive, in step 418, the CU (201) actuates braking of the right inner rear wheel. In step 419, the CU (201) sets the rotational speed of the front wheels to be a second speed greater than the speed of the rear wheels. In an example, the CU (201) can further increase the rotational speed of the front wheels to be 1.6 times faster, as compared to the rear wheels. The various actions in method 400 may be performed in the order presented, in a different order or simultaneously. Further, in some embodiments, some actions listed in FIGS. 4A, 4B, 4C and 4D may be omitted.

Figure 5:
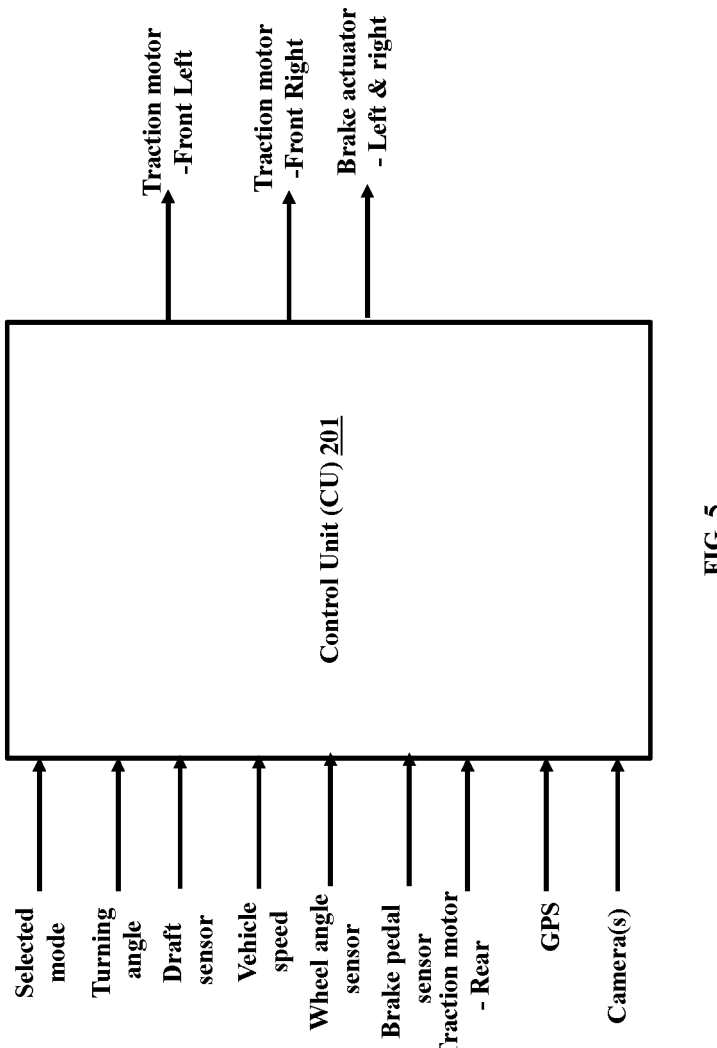
FIG. 5 depicts an architecture wherein an independent traction motor is used for each of the front wheels and a single traction motor is used for the rear wheels, according to embodiments as disclosed herein.
Figure 6A:
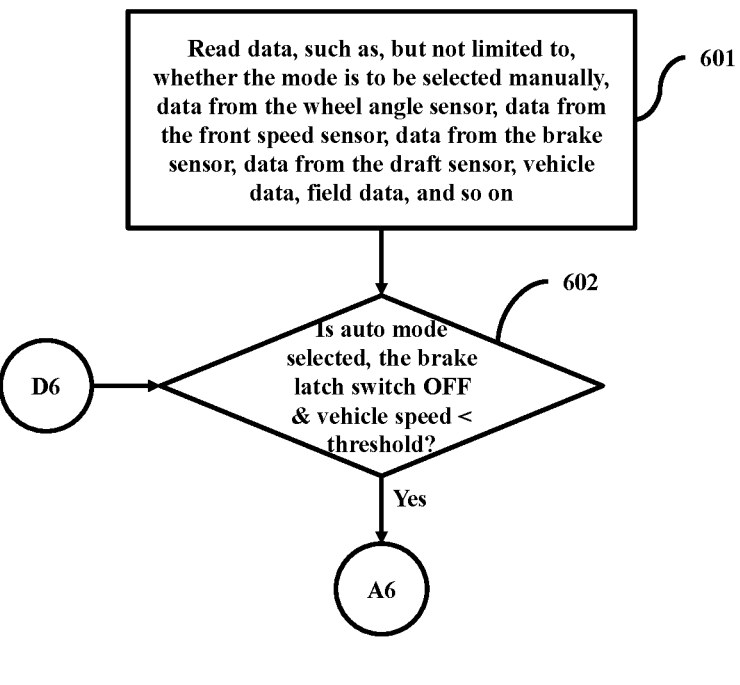
FIGS. 6A, 6B, 6C and 6D are flowcharts depicting the process of using an independent traction motor for each of the front wheels and a single traction motor for the rear wheels, according to embodiments as disclosed herein.
Figure 6B:
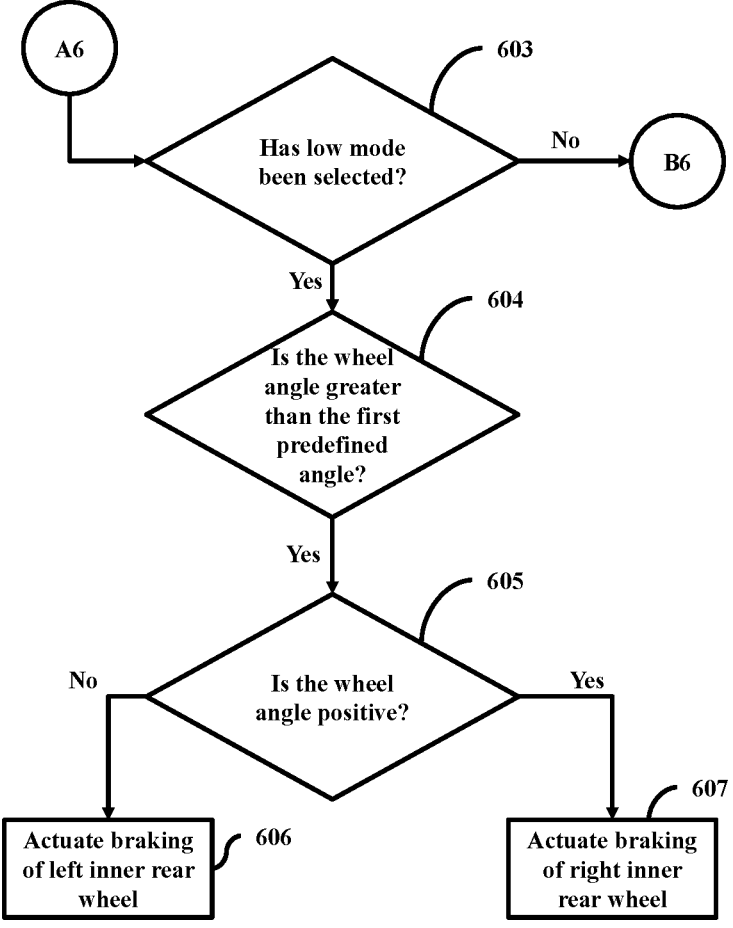
Figure 6C:
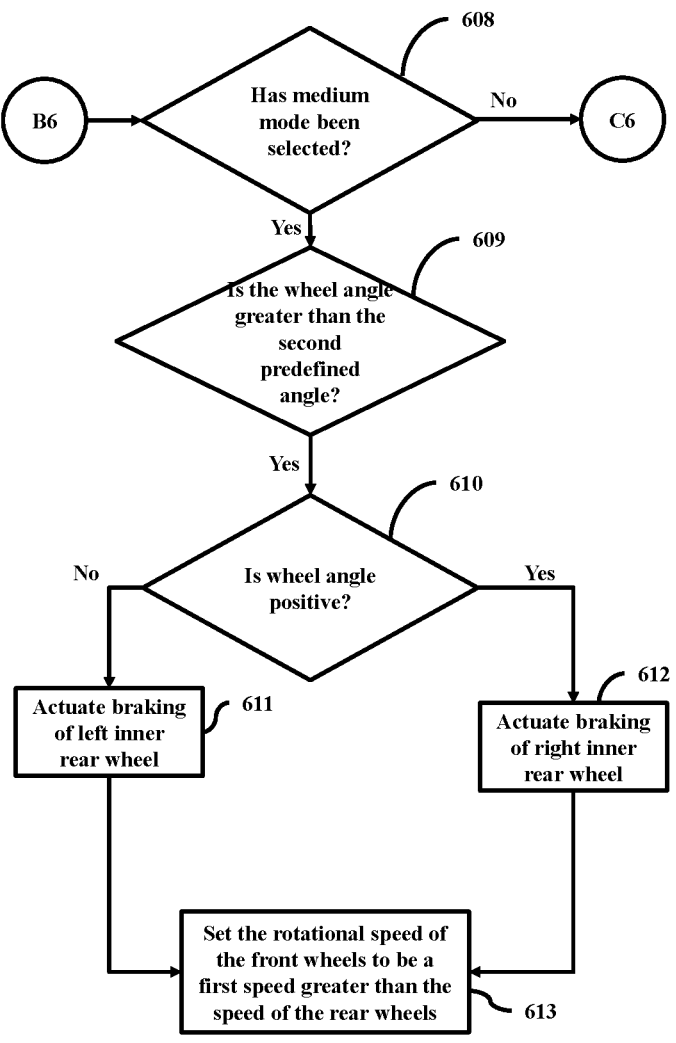
Figure 6D:
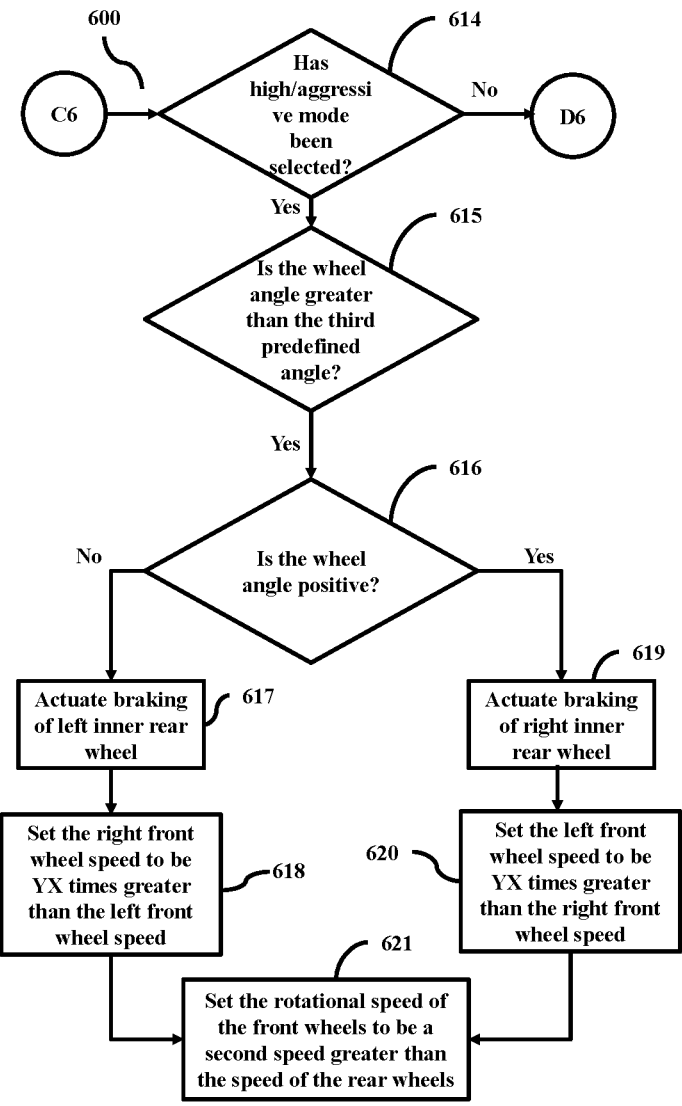

FIG. 5 depicts an architecture wherein an independent traction motor is used for each of the front wheels and a single traction motor is used for the rear wheels. Only the rear axles of the vehicle have a differential to enable the inner wheel to slip during a turning operation. Based on a plurality of factors (such as whether the mode has been selected manually, turning angle, soil conditions, vehicle speed, wheel angle, brake pedal latch status, the GPS sensor, and the camera), the CU (201) can actuate the inner wheel brake actuator and/or speed of the front wheels (based on the mode, that has been currently selected).

If the low mode has been selected, and if the output of the wheel angle sensor is greater than the first predefined angle, and the brake pedal latch switch is off, the CU (201) activates one of the brake actuators (either the left side or the right side), depending on which side the vehicle is turning. Depending on the turning side, the CU (201) can apply brakes to the respective inner rear wheel. The CU (201) can determine that the vehicle is making a right turn, by detecting that the wheel angle is positive. The CU (201) can determine that the vehicle is making a left turn, by detecting that the wheel angle is negative.

If the medium mode has been selected, and if the output of the wheel angle sensor is greater than the second predefined angle (but less than the first predefined angle), and the brake pedal latch switch is off, the CU (201) activates one of the brake actuators (either the left side or the right side), depending on which side the vehicle is turning. The CU (201) can determine that the vehicle is making a right turn, by detecting that the wheel angle is positive. The CU (201) can determine that the vehicle is making a left turn, by detecting that the wheel angle is negative. Depending on the turning side, the CU (201) can apply brakes to the respective inner rear wheel. The CU (201) can further increase the rotational speed of the front wheels to be a first speed greater than the rotational speed of the rear wheels. In an example, the CU (201) can further increase the rotational speed of the front wheels to be 1.2 times faster, as compared to the rear wheels. The CU (201) can further rotate the outer front wheel faster than the inner front wheel.

If high/aggressive mode has been selected, and if the output of the wheel angle sensor is greater than the third predefined angle, and the brake pedal latch switch is off, the CU (201) activates one of the brake actuators (either the left side or the right side), depending on which side the vehicle is turning. The CU (201) can determine that the vehicle is making a right turn, by detecting that the wheel angle is positive. The CU (201) can determine that the vehicle is making a left turn, by detecting that the wheel angle is negative. Depending on the turning side, the CU (201) can apply brakes to the respective inner rear wheel. The CU (201) can further increase the rotational speed of the front wheels to be a second speed greater than the rotational speed of the rear wheels. In an example, the CU (201) can further increase the rotational speed of the front wheels to be 1.6 times faster, as compared to the rotational speed of the rear wheels. The CU (201) can further increase the rotational speed of the front outer wheel to be a third speed greater than the speed of the front inner wheels. In an example, the CU (201) can further increase the rotational speed of the front outer wheels to be 1.2 times faster, as compared to the front inner wheels.

FIGS. 6A, 6B, 6C and 6D are flowcharts depicting the process of using an independent traction motor for each of the front wheels and a single traction motor for the rear wheels. In step 601, the CU (201) reads data, such as, but not limited to, whether the mode is to be selected manually, data from the wheel angle sensor, data from the front speed sensor, data from the rear speed sensor, data from the brake latch switch, data from the draft sensor, vehicle data, field data, and so on. In step 602, the CU (201) checks if the mode has to be selected automatically, the brake latch switch is OFF, and the vehicle speed is lower than the predefined speed threshold. If the mode has to be selected automatically, the brake latch switch is OFF, and the vehicle speed is lower than the predefined speed threshold, in step 603, the CU (201) checks if the low mode has been selected. If the low mode has been selected, in step 604, the CU (201) checks if the wheel angle is greater than the first predefined angle. If the wheel angle is greater than the first predefined angle, in step 605, the CU (201) checks if the wheel angle is positive. If the wheel angle is not positive, in step 606, the CU (201) actuates braking of the left inner rear wheel. If the wheel angle is positive, in step 607, the CU (201) actuates braking of the right inner rear wheel.

If the low mode has not been selected, in step 608, the CU (201) checks if the medium mode has been selected. If the medium mode has been selected, in step 609, the CU (201) checks if the wheel angle is greater than the second predefined angle. If the wheel angle is greater than the second predefined angle, in step 610, the CU (201) checks if the wheel angle is positive. If the wheel angle is not positive, in step 611, the CU (201) actuates braking of the left inner rear wheel. If the wheel angle is positive, in step 612, the CU (201) actuates braking of the right inner rear wheel. In step 613, the CU (201) sets the rotational speed of the front wheels to be a first speed greater than the speed of the rear wheels. In an example, the CU (201) can further increase the rotational speed of the front wheels to be 1.2 times faster, as compared to the rotational speed of the rear wheels.

If the medium mode has not been selected, in step 614, the CU (201) checks if the high/aggressive mode has been selected. If the high mode has been selected, in step 615, the CU (201) checks if the wheel angle is greater than the third predefined angle. If the wheel angle is greater than the third predefined angle, in step 616, the CU (201) checks if the wheel angle is positive. If the wheel angle is not positive, in step 617, the CU (201) actuates braking of the left inner rear wheel. In step 618, the CU (201) sets the right front wheel speed to be YX times greater than the left front wheel speed. In an example herein, the CU (201) sets the right front wheel speed to be 1.2 times (i.e., the value of YX is 1.2) greater than the left front wheel speed. If the wheel angle is positive, in step 619, the CU (201) actuates braking of the right inner rear wheel. In step 620, the CU 101 sets the left front wheel speed to be YX times greater than the right front wheel speed. In step 621, the CU (201) sets the rotational speed of the front wheels to be a second speed greater than the speed of the rear wheels. In an example, the CU (201) can further increase the rotational speed of the front wheels to be 1.6 times faster, as compared to the rotational speed of the rear wheels. The various actions in method 600 may be performed in the order presented, in a different order or simultaneously. Further, in some embodiments, some actions listed in FIGS. 6A, 6B, 6C and 6D may be omitted.

Figure 7:
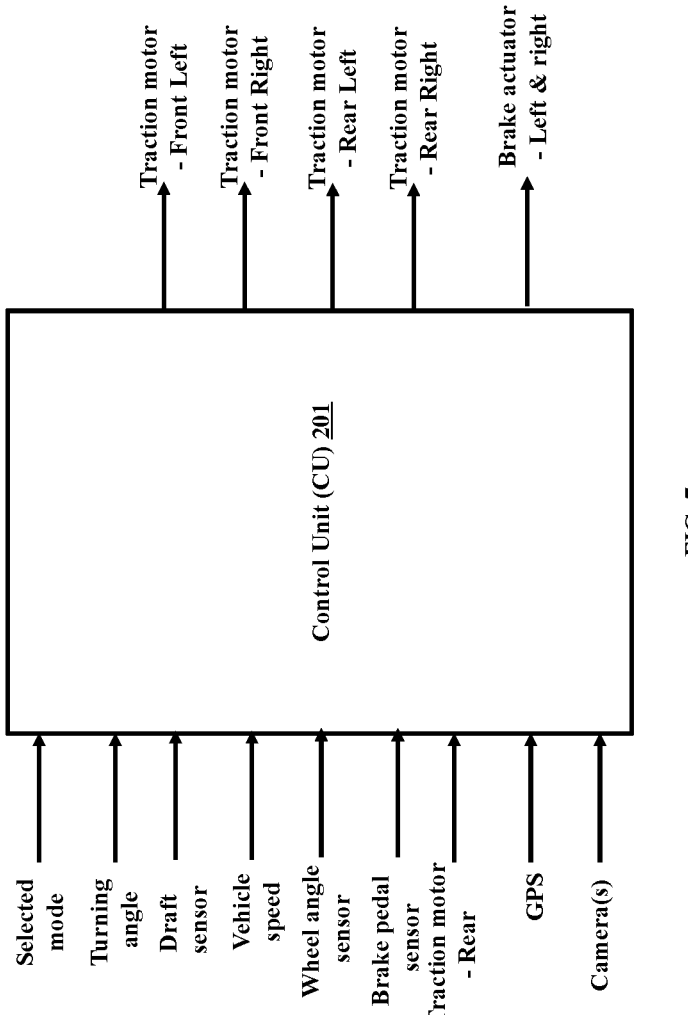
FIG. 7 depicts an architecture wherein independent traction motors are used for each of the front wheels and are used for each of the rear wheels, according to embodiments as disclosed herein.
Figure 8A:
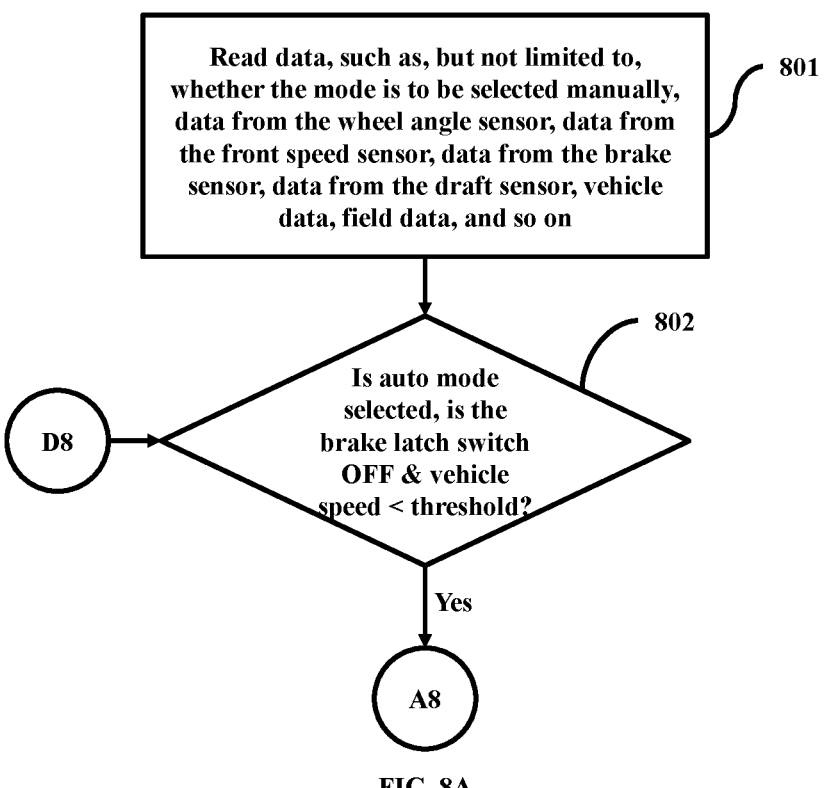
FIGS. 8A, 8B, 8C and 8D are flowcharts depicting the process of using independent traction motors for each of the front wheels and for each of the rear wheels, according to embodiments as disclosed herein.
Figure 8B:
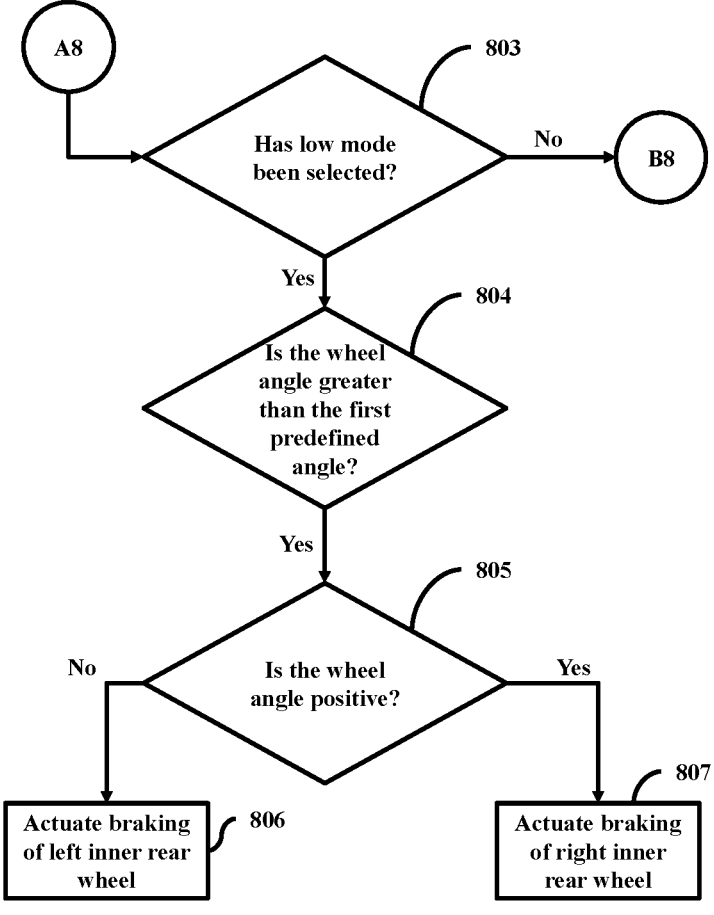
Figure 8C:
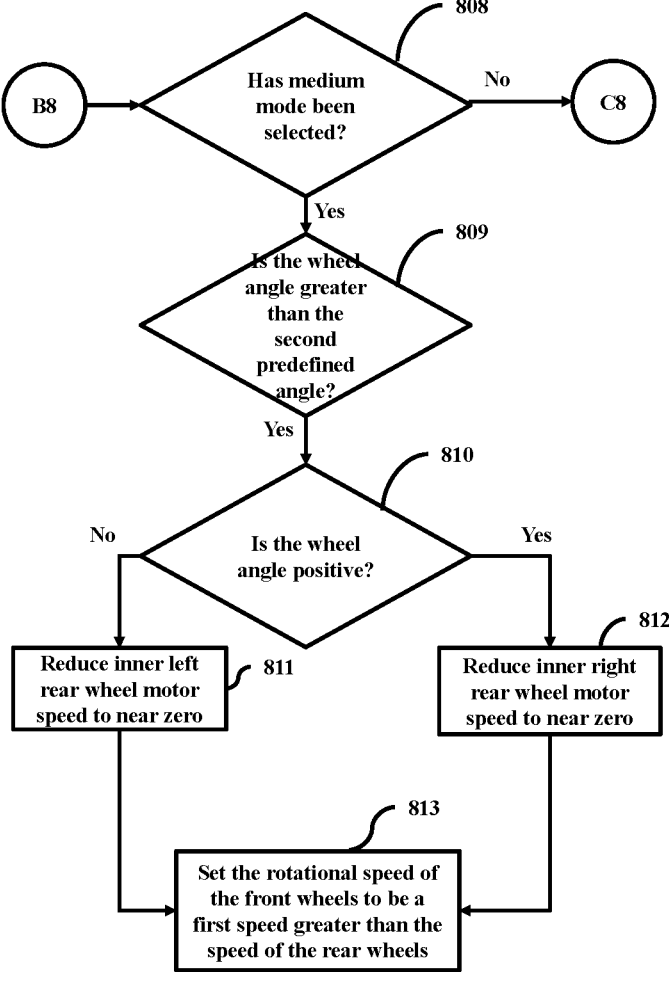
Figure 8D:
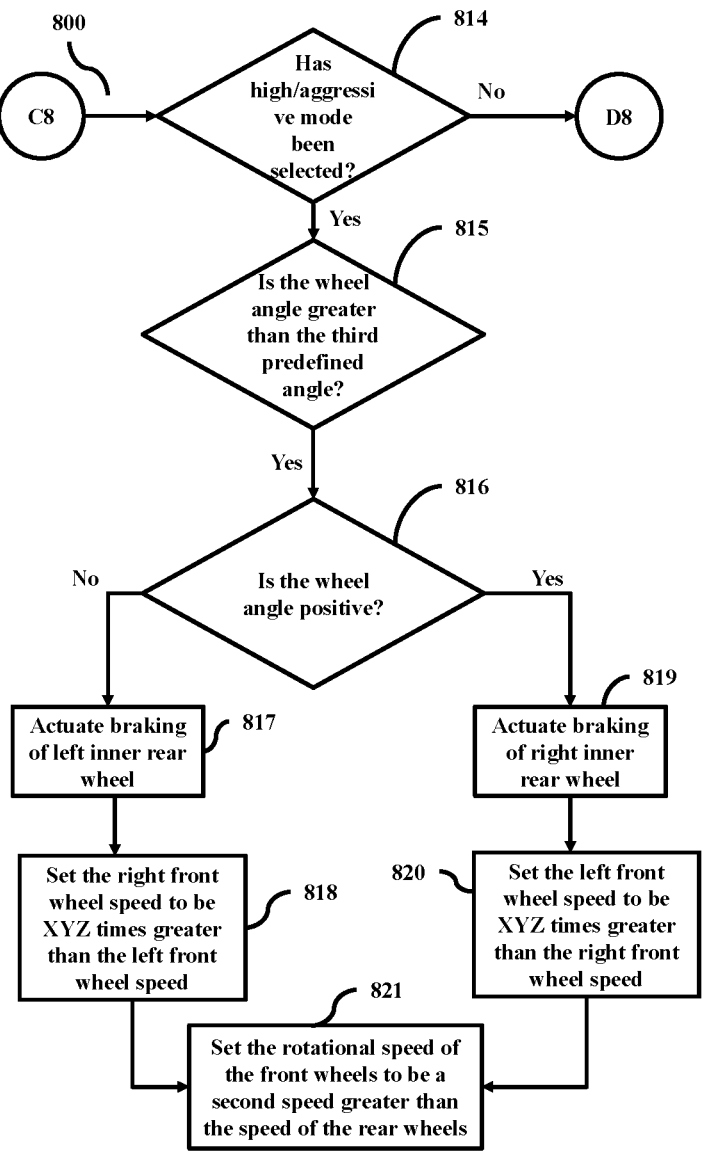

FIG. 7 depicts an architecture wherein independent traction motors are used for each of the front wheels and are used for each of the rear wheels. Consider that the vehicle is equipped with independent traction motor for each of the front wheels and the rear wheels. Based on factors such as whether the mode has been selected manually, turning angle, soil conditions, vehicle speed, wheel angle, brake pedal status, the GPS sensor and the camera, the CU (201) can actuate the inner wheel brake actuator and/or speed of the front wheels (based on the mode, that has been currently selected).

If the low mode has been selected, and if the output of the wheel angle sensor is greater than the first predefined angle, the CU (201) can reduce the speed of the inner rear wheel motor to near zero.

If the medium mode has been selected, and if the output of the wheel angle sensor is greater than the second predefined angle (but less than the first predefined angle), the CU (201) can reduce the speed of the inner rear wheel motor to near zero. The CU (201) can further increase the rotational speed of the front wheels to a first speed greater than the speed of the rear wheels. In an example, the CU (201) can further increase the rotational speed of the front wheels to be 1.2 times faster, as compared to the rotational speed of the rear wheels. The CU (201) can further rotate the outer front wheel faster than the inner front wheel.

If high/aggressive mode has been selected, and if the output of the wheel angle sensor is greater than the third predefined angle (but less than the second predefined angle), the CU (201) can reduce the speed of the inner rear wheel motor to near zero. The CU (201) can further increase the rotational speed of the front wheels to a second speed greater than the speed of the rear wheels. In an example, the CU (201) can further increase the rotational speed of the front wheels to be 1.6 times faster, as compared to the rotational speed of the rear wheels. The CU (201) can further increase the rotational speed of the front outer wheel to be a third speed greater than the speed of the front inner wheels. In an example, the CU (201) can further increase the rotational speed of the front outer wheels to be 1.2 times faster, as compared to the front inner wheels.

FIGS. 8A, 8B, 8C and 8D are flowcharts depicting the process of using independent traction motors for each of the front wheels and for each of the rear wheels. In step 801, the CU (201) reads data, such as, but not limited to, whether the mode is to be selected manually, data from the wheel angle sensor, data from the front speed sensor, data from the rear speed sensor, data from the brake latch switch, data from the draft sensor, vehicle data, field data, and so on. In step 802, the CU (201) checks if the mode has to be selected automatically, the brake latch switch is OFF, and the vehicle speed is less than the predefined speed threshold. If the mode has to be selected automatically, the brake latch switch is OFF, and the vehicle speed is less than the predefined speed threshold, in step 803, the CU (201) checks if the low mode has been selected. If the low mode has been selected, in step 804, the CU (201) checks if the wheel angle is greater than the first predefined angle. If the wheel angle is greater than the first predefined angle, in step 805, the CU (201) checks if the wheel angle is positive. If the wheel angle is not positive, in step 806, the CU (201) actuates braking of the left inner rear wheel. If the wheel angle is positive and the speed of the vehicle is less than the pre-defined speed threshold, in step 807, the CU (201) actuates the braking of the right inner rear wheel.

If the low mode has not been selected, in step 808, the CU (201) checks if the medium mode has been selected. If the medium mode has been selected, in step 809, the CU (201) checks if the wheel angle is greater than the second predefined angle. If the wheel angle is greater than the second predefined angle, in step 810, the CU (201) checks if the wheel angle is positive. If the wheel angle is not positive, in step 811, the CU (201) reduces the speed of the inner left rear wheel to near zero. If the wheel angle is positive, in step 812, the CU (201). In step 813, the CU (201) sets the rotational speed of the front wheels to be a first speed greater than the speed of the rear wheels. In an example, the CU (201) can further increase the rotational speed of the front wheels to be 1.2 times faster, as compared to the rear wheels.

If the medium mode has not been selected, in step 814, the CU (201) checks if the high/aggressive mode has been selected. If the high/aggressive mode has been selected, in step 815, the CU (201) checks if the wheel angle is greater than the third predefined angle. If the wheel angle is greater than the third predefined angle, in step 816, the wheel angle is positive. If the wheel angle is not positive, in step 817, the CU (201) actuates braking of the left inner rear wheel. In step 818, the CU (201) sets the speed of the right front wheel to be XYZ times greater than the speed of the left front wheel. If the wheel angle is positive, in step 819, the CU (201) actuates braking of the right inner rear wheel. In step 820, the CU (201) sets the speed of the left front wheel to be XYZ times greater than the speed of the right front wheel. In step 821, the CU (201) sets the rotational speed of the front wheels to be a second speed greater than the speed of the rear wheels. In an example, the CU (201) can further increase the rotational speed of the front wheels to be 1.6 times faster, as compared to the rotational speed of the rear wheels.

The various actions in method 800 may be performed in the order presented, in a different order or simultaneously. Further, in some embodiments, some actions listed in FIGS. 8A, 8B, 8C and 8D may be omitted.

Figure 9:
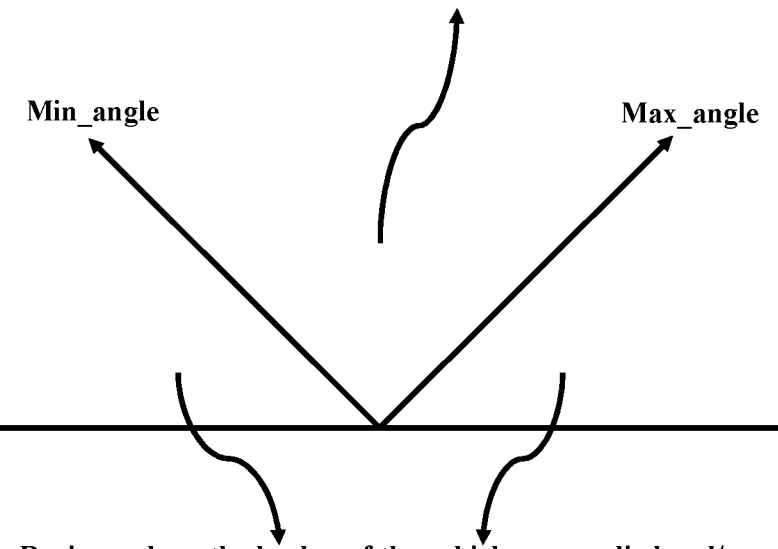
FIG. 9 is an example diagram depicting the angular range over which the brakes and/or the speed of the vehicle may be automatically adjusted, according to embodiments as disclosed herein.

FIG. 9 is an example diagram depicting the angular range over which the brakes and/or the speed of the vehicle may be automatically adjusted. The CU (201) can check if the angle of the wheel is greater than the minimum angle (min_angle) or less than the maximum angle (max_angle), and the CU (201) can apply the brakes of the vehicle and/or adjust the speed of the vehicle (if the aforementioned angular conditions are met).

The embodiments disclosed herein can be implemented through at least one software program running on at least one hardware device and performing network management functions to control the network elements. The elements include blocks which can be at least one of a hardware device, or a combination of hardware device and software module.

The embodiment disclosed herein describes methods and systems for optimizing the productivity and improving the stability of electric vehicles by automatically speeding up front wheels and outer wheels of the vehicle, during operations. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

We claim:

1. A method for assisting an electric vehicle in headland operations, the method comprising:

reading (401), by a control unit (201), data from wheel angle sensors, data from front wheel speed sensors, data from rear wheel speed sensors, data from brake latch switches, soil condition data from a draft sensor (204), vehicle data, and field data;

checking (402), by the control unit (201), if a brake latch switch is OFF, and vehicle speed is less than a predefined speed threshold, if a mode of operation is to be selected automatically;

automatically selecting, by the control unit (201), one of a low mode, a medium mode, and a high mode based on data from wheel angle sensors, data from the wheel speed sensors, data from the brake latch switches, the soil condition, the vehicle data, and the field data;

operating, by the control unit (201), one of a left inner rear wheel brake unit or a right inner rear wheel brake unit for selectively braking one of a left inner rear wheel or a right inner rear wheel respectively while taking a left turn or a right turn by the vehicle respectively according to the selected mode; and operating, by the control unit (201), at least one wheel traction motor for controlling speed of rotation of wheels of the vehicle according to the selected mode.

2. The method, as claimed in claim 1, wherein the vehicle comprises a single traction motor for front wheels of the vehicle and a single traction motor for rear wheels of the vehicle, wherein the method further comprises checking (403), by the control unit (201), if the low mode has been selected and if a wheel angle is greater than a first predefined angle; wherein if the wheel angle is greater than the first predefined angle, the method comprises:

checking (405), by the control unit (201), if the wheel angle is positive;

actuating (406), by the control unit (201), braking of a left inner rear wheel of the vehicle, if the wheel angle is not positive; and actuating (407), by the control unit (201), braking of a right inner rear wheel of the vehicle, if the wheel angle is positive;

checking (408, 409), by the control unit (201), if medium mode has been selected and if a wheel angle is greater than a second predefined angle; wherein if the wheel angle is greater than the second predefined angle, the method comprises:

checking (410), by the control unit (201), if the wheel angle is positive;

actuating (411), by the control unit (201), braking of a left inner rear wheel of the vehicle, if the wheel angle is not positive;

actuating (412), by the control unit (201), braking of a right inner rear wheel of the vehicle, if the wheel angle is positive; and setting (413), by the control unit (201), a rotational speed of the front wheels of the vehicle to be a first speed greater than speed of rear wheels of the vehicle; and checking (414, 415), by the control unit (201), if the high mode has been selected and if a wheel angle is greater than a third predefined angle; wherein if the wheel angle is greater than the third predefined angle, the method comprises:

checking (416), by the control unit (201), if the wheel angle is positive;

actuating (417), by the control unit (201), braking of a left inner rear wheel of the vehicle, if the wheel angle is not positive;

actuating (418), by the control unit (201), braking of a right inner rear wheel of the vehicle, if the wheel angle is positive; and setting (419), by the control unit (201), a rotational speed of the front wheels of the vehicle to be a second speed greater than speed of rear wheels of the vehicle.

3. The method, as claimed in claim 1, wherein the vehicle comprises an independent traction motor for each of front wheels of the vehicle and a single traction motor for rear wheels of the vehicle, wherein the method further comprises checking (603, 604), by the control unit (201), if the low mode has been selected and if a wheel angle is greater than a first predefined angle; wherein if the wheel angle is greater than the first predefined angle, the method comprises:

checking (605), by the control unit (201), if the wheel angle is positive;

actuating (606), by the control unit (201), braking of a left inner rear wheel of the vehicle, if the wheel angle is not positive; and actuating (607), by the control unit (201), braking of a right inner rear wheel of the vehicle, if the wheel angle is positive;

checking (608, 609), by the control unit (201), if the medium mode has been selected and if a wheel angle is greater than a second predefined angle; wherein if the wheel angle is greater than the second predefined angle, the method comprises:

checking (610), by the control unit (201), if the wheel angle is positive;

actuating (611), by the control unit (201), braking of a left inner rear wheel of the vehicle;

actuating (613), by the control unit (201), braking of a right inner rear wheel of the vehicle and setting (614), by the control unit (201), speed of the left front wheel to be greater than speed of the right front wheel, if the wheel angle is positive; and setting (615), by the control unit (201), a rotational speed of the front wheels of the vehicle to be a first speed greater than speed of rear wheels of the vehicle; and checking (616, 617), by the control unit (201), if the high mode has been selected and if a wheel angle is greater than a third predefined angle; wherein if the wheel angle is greater than the third predefined angle, the method comprises:

checking (618), by the control unit (201), if the wheel angle is positive;

actuating (619), by the control unit (201), braking of a left inner rear wheel of the vehicle and setting (620), by the control unit (201), speed of the right front wheel to be a first speed greater than speed of the left front wheel, if the wheel angle is not positive;

actuating (621), by the control unit (201), braking of a right inner rear wheel of the vehicle and setting (622), by the control unit (201), speed of the left front wheel to be a first speed greater than speed of the right front wheel, if the wheel angle is positive; and setting (623), by the control unit (201), a rotational speed of the front wheels of the vehicle to be a second speed greater than speed of rear wheels of the vehicle.

4. The method, as claimed in claim 1, wherein front wheels and rear wheels of the vehicle use independent traction motors, wherein the method further comprises checking (803, 804), by the control unit (201), if the low mode has been selected and if a wheel angle is greater than a first predefined angle; wherein if the wheel angle is greater than the first predefined angle, the method comprises:

checking (805), by the control unit (201), if the wheel angle is positive;

actuating (806), by the control unit (201), braking of a left inner rear wheel of the vehicle, if the wheel angle is not positive; and actuating (807), by the control unit (201), braking of a right inner rear wheel of the vehicle, if the wheel angle is positive;

checking (808, 809), by the control unit (201), if the medium mode has been selected and if a wheel angle is greater than a second predefined angle; wherein if the wheel angle is greater than the second predefined angle, the method comprises:

checking (810), by the control unit (201), if the wheel angle is positive;

actuating (811), by the control unit (201), braking of a left inner rear wheel of the vehicle, if the wheel angle is not positive;

actuating (813), by the control unit (201), braking of a right inner rear wheel of the vehicle, if the wheel angle is positive; and setting (815), by the control unit (201), a rotational speed of the front wheels of the vehicle to be a first speed greater than speed of rear wheels of the vehicle; and checking (816, 817), by the control unit (201), if the high mode has been selected and if a wheel angle is greater than a third predefined angle; wherein if the wheel angle is greater than the third predefined angle, the method comprises:

checking (818), by the control unit (201), if the wheel angle is positive;

actuating (819), by the control unit (201), braking of a left inner rear wheel of the vehicle and setting (820), by the control unit (201), speed of the right front wheel to be a first speed greater than speed of the left front wheel, if the wheel angle is not positive;

actuating (821), by the control unit (201), braking of a right inner rear wheel of the vehicle and setting (822), by the control unit (201), speed of the left front wheel to be a first speed greater than speed of the right front wheel, if the wheel angle is positive; and setting (823), by the control unit (201), a rotational speed of the front wheels of the vehicle to be a second speed greater than speed of rear wheels of the vehicle.

5. The method, as claimed in claim 1, wherein the method comprises selecting, by the control unit (201), the low mode, if the headland required for the low mode is equal to sum of a turning radius of the vehicle, half a working width of the vehicle, and a safety distance; and angle of the steering wheel of the vehicle is greater than a first pre-defined angle, wherein in the low mode, the method comprises providing instructions to the user to skip two rows and then attempt the headland turn;

selecting, by the control unit (201), the medium mode, if the headland required for the medium mode is equal to sum of a turning radius of the vehicle, and half a working width of the vehicle; and angle of the steering wheel of the vehicle is greater than a second pre-defined angle, wherein in the medium mode, the method comprises providing instructions to the user to skip a row and then attempt the headland turn; and selecting, by the control unit (201), the high mode, if the headland required for the low mode is equal to sum of a turning radius of the vehicle, and half a working width of the vehicle, minus a safety distance; and angle of the steering wheel of the vehicle is greater than a third pre-defined angle, wherein in the high mode, the method comprises providing instructions to the user to skip a row and then attempt the headland turn.

6. The method, as claimed in claim 1, wherein the method comprises:

checking, by the control unit (201), if the wheel angle is greater than a minimum angle, or less than a maximum angle; and performing, by the control unit (201), at least one of applying brakes of the vehicle; and adjusting a speed of the vehicle, if the wheel angle is greater than the minimum angle, or less than the maximum angle.

7. A system (200) for assisting an electric vehicle in headland operations, the system (200) comprising:

a control unit (201); and a draft sensor (204), wherein the control unit (201) is configured to:

read data from wheel angle sensors, data from front wheel speed sensors, data from rear wheel speed sensors, data from brake latch switches, soil condition data from the draft sensor (204), vehicle data, and field data;

check if a brake latch switch is OFF, and vehicle speed is less than a pre-defined speed threshold, if a mode of operation is to be selected automatically;

automatically select one of a low mode, a medium mode, and a high mode based on data from wheel angle sensors, data from the wheel speed sensors, data from the brake latch switches, the soil condition data, the vehicle data, and the field data;

operate one of a left inner rear wheel brake unit or a right inner rear wheel brake unit for selectively braking one of a left inner rear wheel or a right inner rear wheel respectively while taking a left turn or a right turn by the vehicle respectively according to the selected mode; and operate at least one wheel traction motor for controlling speed of rotation of wheels of the vehicle according to the selected mode.

8. The system as claimed in claim 7, wherein the vehicle comprises a single traction motor for front wheels of the vehicle and a single traction motor for rear wheels of the vehicle, wherein the control unit (201) is further configured to:

check if the low mode has been selected and if a wheel angle is greater than a first predefined angle; wherein if the wheel angle is greater than the first predefined angle by:

check if the wheel angle is positive;

actuate braking of a left inner rear wheel of the vehicle, if the wheel angle is not positive; and actuate braking of a right inner rear wheel of the vehicle, if the wheel angle is positive;

check if medium mode has been selected and if a wheel angle is greater than a second predefined angle; wherein if the wheel angle is greater than the second predefined angle:

check if the wheel angle is positive;

actuate braking of a left inner rear wheel of the vehicle, if the wheel angle is not positive;

actuate braking of a right inner rear wheel of the vehicle, if the wheel angle is positive; and set a rotational speed of the front wheels of the vehicle to be a first speed greater than speed of rear wheels of the vehicle; and check if the high mode has been selected and if a wheel angle is greater than a third predefined angle; wherein if the wheel angle is greater than the third predefined angle:

check if the wheel angle is positive;

actuate braking of a left inner rear wheel of the vehicle, if the wheel angle is not positive;

actuate braking of a right inner rear wheel of the vehicle, if the wheel angle is positive; and set a rotational speed of the front wheels of the vehicle to be a second speed greater than speed of rear wheels of the vehicle.

9. The system, as claimed in claim 8, wherein the vehicle comprises an independent traction motor for each of front wheels of the vehicle and a single traction motor for rear wheels of the vehicle, wherein the control unit (201) is further configured to:

check if the low mode has been selected and if a wheel angle is greater than a first predefined angle; wherein if the wheel angle is greater than the first predefined angle:

check if the wheel angle is positive;

actuate braking of a left inner rear wheel of the vehicle, if the wheel angle is not positive; and actuate braking of a right inner rear wheel of the vehicle, if the wheel angle is positive;

check if the medium mode has been selected and if a wheel angle is greater than a second predefined angle; wherein if the wheel angle is greater than the second predefined angle:

check if the wheel angle is positive;

actuate braking of a left inner rear wheel of the vehicle;

actuate braking of a right inner rear wheel of the vehicle and setting speed of the left front wheel to be greater than speed of the right front wheel, if the wheel angle is positive; and set a rotational speed of the front wheels of the vehicle to be a first speed greater than speed of rear wheels of the vehicle; and check if the high mode has been selected and if a wheel angle is greater than a third predefined angle; wherein if the wheel angle is greater than the third predefined angle:

check if the wheel angle is positive;

actuate braking of a left inner rear wheel of the vehicle and setting speed of the right front wheel to be a first speed greater than speed of the left front wheel, if the wheel angle is not positive;

actuate braking of a right inner rear wheel of the vehicle and setting speed of the left front wheel to be a first speed greater than speed of the right front wheel, if the wheel angle is positive; and set a rotational speed of the front wheels of the vehicle to be a second speed greater than speed of rear wheels of the vehicle.

10. The system, as claimed in claim 8, wherein front wheels and rear wheels of the vehicle use independent traction motors, wherein the control unit (201) is further configured to:

check if the low mode has been selected and if a wheel angle is greater than a first predefined angle; wherein if the wheel angle is greater than the first predefined angle:

check if the wheel angle is positive;

actuate braking of a left inner rear wheel of the vehicle, if the wheel angle is not positive; and actuate braking of a right inner rear wheel of the vehicle, if the wheel angle is positive;

check if the medium mode has been selected and if a wheel angle is greater than a second predefined angle; wherein if the wheel angle is greater than the second predefined angle:

check if the wheel angle is positive;

actuate braking of a left inner rear wheel of the vehicle, if the wheel angle is not positive;

actuate braking of a right inner rear wheel of the vehicle, if the wheel angle is positive; and set a rotational speed of the front wheels of the vehicle to be a first speed greater than speed of rear wheels of the vehicle; and check if the high mode has been selected and if a wheel angle is greater than a third predefined angle; wherein if the wheel angle is greater than the third predefined angle:

check if the wheel angle is positive;

actuate braking of a left inner rear wheel of the vehicle and setting speed of the right front wheel to be a first speed greater than speed of the left front wheel, if the wheel angle is not positive;

actuate braking of a right inner rear wheel of the vehicle and setting speed of the left front wheel to be a first speed greater than speed of the right front wheel, if the wheel angle is positive; and set a rotational speed of the front wheels of the vehicle to be a second speed greater than speed of rear wheels of the vehicle.

11. The system, as claimed in claim 8, wherein the control unit (201) is further configured to select the low mode, if the headland required for the low mode is equal to sum of a turning radius of the vehicle, half a working width of the vehicle, and a safety distance; and angle of the steering wheel of the vehicle is greater than the first pre-defined angle, wherein in the low mode, the control unit is configured to provide instructions to the user to skip two rows and then attempt the headland turn;

select the medium mode, if the headland required for the medium mode is equal to sum of a turning radius of the vehicle, and half a working width of the vehicle; and angle of the steering wheel of the vehicle is greater than a second pre-defined angle, wherein in the medium mode, the control unit (201) is further configured to provide instructions to the user to skip a row and then attempt the headland turn; and select the high mode, if the headland required for the low mode is equal to sum of a turning radius of the vehicle, and half a working width of the vehicle, minus a safety distance; and angle of the steering wheel of the vehicle is greater than a third pre-defined angle, wherein in the high mode, the control unit (201) is further configured for providing instructions to the user to skip a row and then attempt the headland turn.

12. The system, as claimed in claim 8, wherein the control unit (201) is further configured for checking if the wheel angle is greater than a minimum angle, or less than a maximum angle; and performing at least one of applying brakes of the vehicle; and adjusting a speed of the vehicle, if the wheel angle is greater than the minimum angle, or less than the maximum angle.

* * * * *